3,514,337
HIGH ENERGY DENSITY BATTERY
Klaus Braeuer, Long Branch, and Karen R. Moyes, Eatontown, N.J., assignors to the United States of America as represented by the Secretary of the Army
No Drawing. Filed June 6, 1968, Ser. No. 734,872
Int. Cl. H01m 17/00
U.S. Cl. 136—100          2 Claims

ABSTRACT OF THE DISCLOSURE

A high energy density organic electrolyte containing electrochemical system or battery is provided in which lithium is the anode. The cathode includes as the cathode active material intercalation compounds of graphite and fluorine of the general formula $(C_xF)_n$ wherein $x$ is a numerical value between about 3.5 and about 7.5 and wherein $n$ refers to the presence of an infinite number of recurring $(C_xF)$ groups in the intercalation compound. The organic electrolyte is a solution of an inorganic lithium salt such as lithium perchlorate or lithium bromide in an organic solvent such as propylene carbonate, dimethyl carbonate, butyrolactone, ethylacetate, nitromethane, dimethyl formamide, or tetrahydrofuran.

---

The invention described herein may be manufactured, used, and licensed by or for the Government for governmental purposes without the payment to us of any royalty thereon.

BACKGROUND OF THE INVENTION

This invention relates to a high energy density organic electrolyte containing electrochemical system or battery.

In recent years, considerable effort has been expended to develop power sources having high energy densities. That is, conventional power sources such as silver zinc cells, ammonia batteries, metal-air batteries, or fuel cells do not have the high energy densities required to meet certain needs as for example, in the exploration of space. In such fields, there are increasing demands for electrical power sources for applications where weight and volume are costly commodities.

The general object of this invention is to provide a high energy density electrochemical system or battery. A more particular object of the invention is to provide such an electrochemical system or battery that is characterized by: (a) high cell voltages and high capacities on discharge, (b) excellent charge retention on activated storage at ambient temperature, (c) low polarization at practical rates of discharge up to ten milliamperes per square centimeter, and (d) a useful temperature range of operation between —20° C. and 120° C.

SUMMARY OF THE INVENTION

A high energy density electrochemical system or battery is provided using an organic electrolyte and lithium as the anode. The cathode includes as the cathode active material graphite-fluorine intercalation compounds of the general formula $(C_xF)_n$, wherein $x$ is a numerical value between 3.5 and 7.5 and wherein $n$ refers to the presence of an infinite number of recurring $(C_xF)$ groups in the intercalation compound. These compounds can be prepared by reacting graphite with a mixture of fluorine and hydrogen fluoride at room temperature. The product is then washed until it is free of acid, dried, and then pulverized.

The lithium anode of the electrochemical system can be conveniently prepared by pressing lithium ribbon onto a copper grid.

The cathode of the electrochemical system can be conveniently prepared by pressing one gram of a mixture of 80 percent by weight $(C_xF)_n$, ten percent graphite, and ten percent paper fiber at a temperature of 190° F. and a pressure of 1,000 pounds per square inch on a metal grid of 20 cm.$^2$ geometric area. Materials such as copper, nickel, titanium, and silver can be used as the grid.

As the electrolyte of the electrochemical system, there may be used solutions of about 1 molar in strength of an inorganic lithium salt such as lithium perchlorate or lithium bromide in an organic solvent such as propylene carbonate, dimethyl carbonate, butyrolactone, ethylacetate, nitromethane, dimethyl formamide or tetrahydrofuran. In general, the electrolyte used must be capable of supplying the ions that react electrochemically both at the anode and cathode. Furthermore, the electrolyte used must be one that does not react with lithium or the cathode active material when the battery is on open circuit.

DESCRIPTION OF THE PREFERRED EMBODIMENT

A cell is made from two flat lithium anodes with a cathode therebetween. In this cell, the cathode active material is of the formula $(C_4F)_n$. A solution of 1 molar lithium perchlorate in propylene carbonate is used as the electrolyte. The open circuit potential of the cell is between 3.3 and 3.5 volts. On discharge, at current densities between 1 and 5 ma./cm.$^2$ and temperature in the range from 25° C. to 100° C., the following data are characteristically observed:

Average voltages: 1.5 volts to 2.5 volts=44 percent to 75 percent voltage efficiency
Capacities: 0.2 to 0.4 amps hrs./0.8 grams of $(C_4F)_n$
Coulombic efficiencies: 50 percent to 100 percent
Watt hours: 0.3 to 0.6 watt hours/0.8 gram of $(C_4F)_n$.

The cathode potentials gradually decrease during the discharge. Voltage plateaus and inflection points are either not observed or are ill-defined. Cell voltages recover almost to their original value when the discharge current is interrupted.

Activated cells, which have been stored for 26 days at room temperature before being discharged do not suffer any losses of capacity.

Depending on the specific conditions of the system, the cells are capable of delivering sustained current densities up to 10 ma./cm.$^2$ and peak currents up to 15 ma./cm.$^2$.

Average voltages above 2.1 v. and 0.42 w. hrs./0.8 gram of active material are observed when cells are discharged at 5 ma./cm.$^2$ and temperatures vary between 23° C. and 100° C.

The foregoing description is intended as illustrative of the invention and not in limitation thereof.

What is claimed is:
1. A high energy density organic electrolyte containing battery comprising
  a pair of spaced lithium anodes,
  a cathode positioned between said anodes and including as the cathode active material an intercalation compound of graphite and fluorine of the general formula $(C_xF)_n$ wherein $x$ is a numerical value between about 3.5 and about 7.5 and wherein $n$ refers to the presence of an infinite number of recurring $(C_xF)$ groups in the intercalation compound, and wherein said organic electrolyte is a solution of an inorganic lithium salt in an organic solvent selected from the group consisting of propylene carbonate, dimethyl carbonate, butyrolactone, ethylacetate, nitromethane, dimethyl formamide, and tetrahydrofuran.

2. A battery according to claim 1 wherein the inorganic lithium salt is selected from the group consisting of 1 molar lithium bromide and 1 molar lithium perchlorate.

References Cited

UNITED STATES PATENTS

| | | | |
|---|---|---|---|
| 3,043,896 | 7/1962 | Herbert et al. | 136—6 |
| 3,073,884 | 1/1963 | Pinkerton | 136—100 |
| 3,185,590 | 5/1965 | Mayer et al. | 136—6 |
| 3,279,952 | 10/1966 | Minnick | 136—83 |
| 3,380,855 | 4/1968 | Mahy et al. | 136—155 |
| 3,413,154 | 11/1968 | Rao | 136—83 |

WINSTON A. DOUGLAS, Primary Examiner

C. F. LeFEVOUR, Assistant Examiner

U.S. Cl. X.R.

136—6, 155